(12) United States Patent
Ohki (10) Patent No.: US 9,042,529 B2
(45) Date of Patent: *May 26, 2015

(54) COMMUNICATION SYSTEM (71) Applicant: NEC INFRONTIA CORPORATION, Kanagawa (JP)

(72) Inventor: Yasuomi Ohki, Kawasaki (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/788,108

(22) Filed: Mar. 7, 2013

(65) Prior Publication Data

US 2013/0182833 A1 Jul. 18, 2013

Related U.S. Application Data (63) Continuation of application No. 11/963,475, filed on Dec. 21, 2007.

(30) Foreign Application Priority Data

Dec. 26, 2006 (JP) .................. 2006-349591

(51) Int. Cl.
*H04M 11/00* (2006.01)
*H04M 3/00* (2006.01)
(Continued)

(52) U.S. Cl.
CPC ........... *H04M 3/005* (2013.01); *H04L 29/1216* (2013.01); *H04L 61/157* (2013.01); *H04L 65/1069* (2013.01)

(58) Field of Classification Search
CPC ............ H04M 7/006; H04M 3/42068; H04M 3/42102; H04M 3/42365; H04M 7/0063; H04M 7/0075; H04M 3/42059; H04M 7/123; H04M 11/066; H04M 7/127; H04L 29/12066; H04L 29/12933
USPC ................... 379/90.01, 93.01, 93.05, 100.01, 379/201.01, 265.02, 265.04, 91.02, 92.03, 379/92.04, 93.07, 93.14, 121.06, 280, 379/355.09

See application file for complete search history.

(56) References Cited

U.S. PATENT DOCUMENTS 6,532,233 B1 3/2003 Momona et al.
6,847,703 B2 1/2005 Shibuya
(Continued)

FOREIGN PATENT DOCUMENTS

JP  2003-348244 A  12/2003
JP  2004-46419 A   2/2004
(Continued)

OTHER PUBLICATIONS

Office Action issued by the United States Patent and Trademark Office, dated Apr. 25, 2013 in related U.S. Appl. No. 11/963,475.
(Continued)

*Primary Examiner* — Akelaw Teshale
(74) *Attorney, Agent, or Firm* — Sughrue Mion, PLLC (57) ABSTRACT

A communication system including a plurality of terminals; and a switchboard connected to the terminals, includes a means for causing each of the terminals to register an identifier and an address of the terminal itself in the switchboard; a means for, when one of the terminals transmits a request of transmitting a list of the terminals connected to the switchboard, causing the switchboard to transmit the list of the terminals to the terminal that transmits the request; a means for, when the terminal that transmits the request selects one of the terminals from the list and transmits the identifier of the selected terminal to the switchboard, causing the switchboard to transmit the address of the selected terminal to the terminal that transmits the request; and a means for causing the terminal that transmits the request to establish a communication with the selected terminal using the received address and a default port number.

4 Claims, 6 Drawing Sheets

OVERALL CONFIGURATION (51) Int. Cl.
*H04L 29/12* (2006.01)
*H04L 29/06* (2006.01)

(56) References Cited

U.S. PATENT DOCUMENTS

| | | | |
|---|---|---|---|
| 6,987,756 | B1 | 1/2006 | Ravindranath et al. |
| 7,099,288 | B1 | 8/2006 | Parker et al. |
| 7,180,889 | B1 * | 2/2007 | Kung et al. .................... 370/352 |
| 8,358,616 | B2 | 1/2013 | Shan et al. |
| 2002/0057698 | A1 | 5/2002 | Kitai et al. |
| 2004/0010541 | A1 * | 1/2004 | Allen et al. .................... 709/203 |
| 2004/0100976 | A1 * | 5/2004 | Chang et al. .................. 370/401 |
| 2004/0243718 | A1 | 12/2004 | Fujiyoshi |
| 2005/0071427 | A1 | 3/2005 | Dorner et al. |
| 2006/0262773 | A1 * | 11/2006 | Tanimoto ....................... 370/351 |
| 2007/0019630 | A1 * | 1/2007 | Kashimoto et al. ........... 370/352 |
| 2007/0217408 | A1 | 9/2007 | Sahashi et al. |
| 2007/0263613 | A1 | 11/2007 | Hara et al. |

FOREIGN PATENT DOCUMENTS

| | | |
|---|---|---|
| JP | 2004-304666 A | 10/2004 |
| JP | 2004-320289 A | 11/2004 |
| JP | 2004-320629 A | 11/2004 |
| JP | 2005269299 A | 9/2005 |
| JP | 2005269574 A | 9/2005 |
| JP | 2005-294993 A | 10/2005 |
| JP | 2006-20048 A | 1/2006 |
| JP | 2006-135448 A | 5/2006 |

OTHER PUBLICATIONS

Japanese Office Action dated Aug. 23, 2011 from the Japanese Patent Office in corresponding Japanese Patent Application No. 2006349591.

Communication, dated Oct. 31, 2012, issued by the Japanese Patent Office in counterpart Japanese Application No. 2011-232789.

* cited by examiner

| 501 | 502 | 503 | 504 | 505 | 506 |
|---|---|---|---|---|---|
| SWITCH-BOARD USER ID | SWITCH-BOARD USER PASSWORD | POSSIBLE COMMUNICATION METHOD: ADDRESS: PORT | COMMUNICATION PARTNER USER ID | EXTERNAL LINE NUMBER | COMMUNICATION PARTNER NUMBER |
| EXAMPLE: userA | EXAMPLE: UserA Pass | EXAMPLE: VOICE:111.111.111.001:Port100 VIDEO:111.111.111.001:Port101 | EXAMPLE: userB ... | EXAMPLE: trunk01 | EXAMPLE: 03-1111-2222 |
| EXAMPLE: userB | EXAMPLE: userB Pass | EXAMPLE: VOICE:111.111.111.002:Port100 VIDEO:111.111.111.002:Port101 | EXAMPLE: userA ... | EXAMPLE: trunk02 | EXAMPLE: — |
| EXAMPLE: userC | EXAMPLE: userC Pass | EXAMPLE: VOICE:ext001:— VIDEO:111.111.111.003:Port100 | EXAMPLE: — ... | | |
| EXAMPLE: userD | EXAMPLE: userD Pass | EXAMPLE: VOICE:111.111.111.004:Port100 VIDEO:111.111.111.005:Port101 | EXAMPLE: — ... | | |

DATABASE WITHIN SWITCHBOARD

| 601 | 602 | 603 | 604 | 605 |
|---|---|---|---|---|
| SWITCH-BOARD USER ID | SWITCH-BOARD USER PASSWORD | POSSIBLE COMMUNICATION METHOD: ADDRESS: PORT | COMMUNICATION PARTNER | COMMUNICATION DESTINATION PORT INITIAL VALUE |
| EXAMPLE: userA | EXAMPLE: UserA Pass | EXAMPLE: VOICE:111.111.111.001:Port100 VIDEO:111.111.111.001:Port101 | EXAMPLE: VOICE:111.111.111.002:Port100 VIDEO:111.111.111.002:Port101 | EXAMPLE: VOICE:Port100 VIDEO:Port101 |

USER SETTING DATA WITHIN TERMINAL

FIG. 10

FLOWCHART OF VIDEO COMMUNICATION BY EXTERNAL VIDEO COMMUNICATION SOFTWARE (BY AUTOMATICALLY FINISHING VIDEO COMMUNICATION SIMULTANEOUSLY WITH END OF VOICE COMMUNICATION (USING CTI))

FIG. 9

FLOWCHART OF VIDEO COMMUNICATION BY EXTERNAL VIDEO COMMUNICATION SOFTWARE (VIDEO COMMUNICATION WHEN VOICE AND VIDEO TERMINALS ARE DIFFERENT AND VIDEO COMMUNICATION PARTNER IS MANUALLY SELECTED)

COMMUNICATION SYSTEM

CROSS REFERENCE TO RELATED APPLICATIONS

This application is a Continuation of U.S. patent application Ser. No. 11/963,475, filed on Dec. 21, 2007, which claims priority from Japanese Patent Application No. 2006-349591, filed on Dec. 26, 2006, the disclosures of which are incorporated herein in their entirety by this reference.

BACKGROUND OF THE INVENTION

1. Field of the Invention

The present invention relates to a communication system including a plurality of terminals and a switchboard connected to the terminals, and a communication method for the communication system.

2. Description of the Related Art

Recently, communication means have diversified. Not only conventionally known voice communication but also various communication means such as video communication, character communication (e.g., mail communication, instant message communication, and chat communication), file sharing communication, whiteboard sharing communication, and application sharing communication have been used as the communication means. Furthermore, a "peer-to-peer (P2P)" model in which terminals directly communicate with each other to exchange terminal information has been on the rise to replace a "server-client model" in which the communication means controls information (such as positions (addresses), communication capabilities and the like of terminals) on terminals such as a switchboard and a server at one location in a centralized manner.

Communication software compliant with the P2P model (hereinafter, "P2P communication software") has spread widely because of its convenience and its high functional improvement speed. P2P communication related techniques are disclosed in, for example, Japanese Patent Application Laid-Open Nos. 2003-348244, 2004-046419, 2004-304666, 2004-320289, 2004-320629, and 2006-020048.

Generally, requirements to support the various communication means are high even for a switchboard designed to be compliant with the server-client model. However, a functional improvement speed of switchboard software is disadvantageously and unavoidably lower than that of P2P model communication software since it is necessary to secure sufficient design and evaluation periods so as to prevent an influence on existing switchboard functions.

Meanwhile, both the switchboard software and the P2P communication software tend to adopt LAN lines using an IP network as a main communication pathway, which provides an environment that facilitates cooperation between the both software.

SUMMARY OF THE INVENTION

It is, therefore, an object of the present invention to easily mount various new communication means in a switchboard compliant with a server-client model by interlocking the switchboard (or switchboard software) with general-purpose communication software compliant with a P2P model by simple mechanism.

According to a first aspect of the present invention, there is provided a communication system including a plurality of terminals; and a switchboard connected to the terminals, comprising: means for causing each of the terminals to register an identifier and an address of the terminal itself in the switchboard; means for, when one of the terminals transmits a request of transmitting a list of the terminals connected to the switchboard, causing the switchboard to transmit the list of the terminals to the terminal that transmits the request; means for, when the terminal that transmits the request selects one of the terminals from the list and transmits the identifier of the selected terminal to the switchboard, causing the switchboard to transmit the address of the selected terminal to the terminal that transmits the request; and means for causing the terminal that transmits the request to establish a communication with the selected terminal using the received address and a default port number.

According to a second aspect of the present invention, there is provided a communication system including a plurality of terminals; and a switchboard connected to the terminals, comprising: means for causing each of the terminals to register an identifier and an address of the terminal itself and a port number corresponding to each communication type in the switchboard; means for, when one of the terminals transmits a request of transmitting a list of the terminals connected to the switchboard, causing the switchboard to transmit the list of the terminals to the terminal that transmits the request; means for, when the terminal that transmits the request selects one of the terminals from the list and transmits the identifier of the selected terminal and the communication type to the switchboard, causing the switchboard to transmit the address of the selected terminal and the port number corresponding to the communication type of the selected terminal to the terminal that transmits the request; and means for causing the terminal that transmits the request to establish a communication with the selected terminal using the received address and the received port number.

According to a third aspect of the present invention, there is provided a communication system including a plurality of terminals, the terminals including a first terminal and a second terminal; and a switchboard connected to the terminals, comprising: means for causing each of the terminals to register an identifier and an address of the terminal itself and a port number corresponding to each communication type in the switchboard; means for causing the first terminal to inquire the switchboard about a possible communication method, the address, and the port number of the second terminal while the first terminal is holding a voice communication with the second terminal; means for causing the switchboard to transmit the possible communication method, the address, and the port number of the second terminal to the first terminal; and means for causing the first terminal to establish a communication with the second terminal using the address and the port number received from the switchboard by a communication method included in the possible communication method received from the switchboard.

According to a fourth aspect of the present invention, there is provided a communication system including a plurality of terminals, the terminals including a first terminal, a second terminal, and a third terminal; and a switchboard connected to the terminals, comprising: means for causing each of the terminals to register an identifier and an address of the terminal itself and a port number corresponding to each communication type in the switchboard; means for causing the first terminal to inquire the switchboard about a possible communication method, the address, and the port number of the third terminal equal in user to the second terminal while the first terminal is holding a voice communication with the second terminal; means for causing the switchboard to transmit the possible communication method, the address, and the port number of the third terminal to the first terminal; and means for causing the first terminal to establish a communication with the third terminal using the address and the port number received from the switchboard by a communication method included in the possible communication method received from the switchboard.

The communication system according to the fourth aspect of the present invention may further comprise: means for detecting that a communication (or the voice communication) between the first terminal and the second terminal is finished; and means for finishing the communication between the first terminal and the third terminal if the communication between the first terminal and the second terminal is finished.

According to a fifth aspect of the present invention, there is provided a communication system comprising: means for registering a LAN line terminal in a switchboard; means for causing a voice terminal to start a voice conference communication; means for receiving a video communication start instruction from a video terminal of a user; means for causing the video terminal to acquire information on all conference communication partners with which the voice terminal holds the communication based on user IDs received from the switchboard; means for causing the video terminal to accept a user's selection of a communication partner from a list of the conference communication partners; and means for causing switchboard terminal software of the video terminal to transmit an address of a communication partner for a video communication with which the voice terminal is holding a voice communication until the video communication with all the conference communication partners holding the video communication is established, and for causing video communication software of the video terminal to establish the video communication with the communication partner of the voice terminal.

According to the present invention, various communication means can be easily added to a voice terminal of a switchboard by using existing P2P communication software.

DESCRIPTION OF THE PREFERRED EMBODIMENTS

Preferred embodiments of the present invention will be described hereinafter in detail with reference to the accompanying drawings.

[First Embodiment]

A communication system according to a first embodiment of the present invention starts a communication by causing a switchboard to transmit information on addresses of switchboard terminals other than a switchboard terminal of the switchboard, and the switchboard terminal that has received the addresses to select a communication partner from among the switchboard terminals at the received addresses, and to pass the address of the selected switchboard terminal to independent general-purpose P2P communication software incorporated in the switchboard terminal.

Furthermore, while the switchboard terminal is holding a voice communication, a communication starts by passing address information on a voice output destination to the general-purpose communication software.

If the switchboard terminal separates from the P2P general-purpose communication software and differs in address, a communication starts by registering information for coupling them with each other in the switchboard and passing the information to the switchboard terminal in response to a request from the switchboard terminal.

Moreover, if the switchboard terminal is holding a voice conference, a communication starts by passing address information on a voice conference partner to the switchboard terminal.

Figure 1:
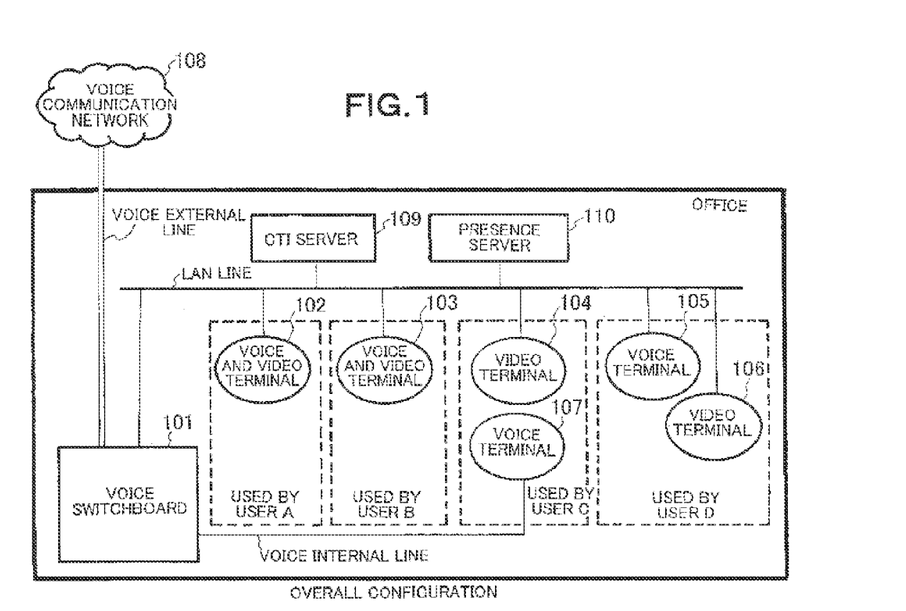
FIG. 1 is a block diagram showing an overall configuration of a communication system according to first to sixth embodiments of the present invention.

A configuration of the communication system using voice lines (i.e., an internal voice line and an external voice line) and a LAN line in an office as shown in FIG. 1 will be described. It is assumed that a communication method realized by the P2P communication software is a video communication.

In the office, a voice switchboard 101 (hereinafter, simply "switchboard") switching voice communication, a voice and video terminal 102 used by a user A and connected to a LAN line, a voice and video terminal 103 used by a user B and connected to the LAN line, a video terminal 104 used by a user C and connected to the LAN line, a voice terminal 107 connected to a voice internal line, a voice terminal 105 used by a user D and connected to the LAN line, a video terminal 106 connected to the LAN line, a CTI (Computer Telephony Integration) server 109 connected to the switchboard 101 and realizing CTI, and a presence server 110 managing and notifying status information (presence) of the terminals 102 to 107 are present.

Further, the switchboard 101 is connected to a voice communication network 108 via a voice external line.

In this way, the switchboard 101 is connected to the voice communication network 108 and the terminals 102 to 107, and controls connection of voice communications held by the terminals 102 to 107.

The CTI server 109 mediates a communication between CTI client software mounted in each of the terminals 102 to 106 connected to the LAN line and the switchboard 101.

The presence server 110 communicates with the switchboard 101 and the terminals 102 to 106 connected to the LAN line, constantly updates and holds the status information (presences) of the terminals 102 to 107, and transmits a notification to each of the terminals 102 to 106 and the switchboard 101 in response to a request.

Figure 2:
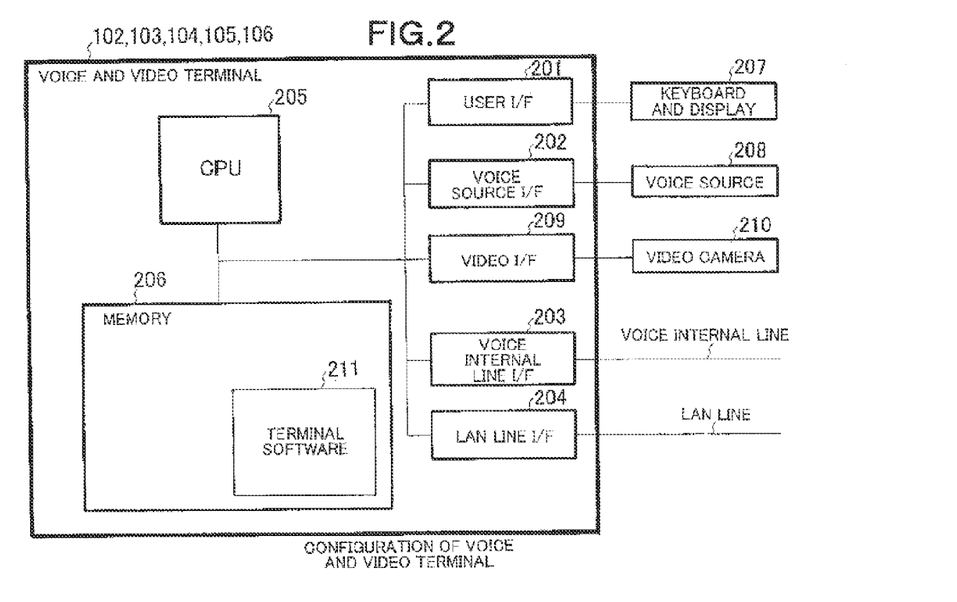
FIG. 2 is a block diagram showing a voice and video terminal shown in FIG. 1.

Referring now to FIG. 2, operations performed by respective constituent elements of each of the terminals 102 to 107 will be outlined. A user interface ("I/F") 201 receives input signals from a keyboard, a mouse or the like and outputs video signals to a display. A voice source I/F 202 transmits and receives voice data to and from a voice source 208 connected to the voice source I/F 202. A voice internal line I/F 203 transmits and receives signals to and from the voice communication line. A LAN line I/F 204 transmits and receives signals to and from the LAN line. A CPU 205 controls entirety of the terminal. A memory 206 is used as a work area when software or data necessary to control the terminal is used. A terminal software 211 is software stored in the memory 206 and executed by the CPU 205. A video I/F 209 receives signals input from a video camera 210 connected to the video I/F 209.

Figure 3:
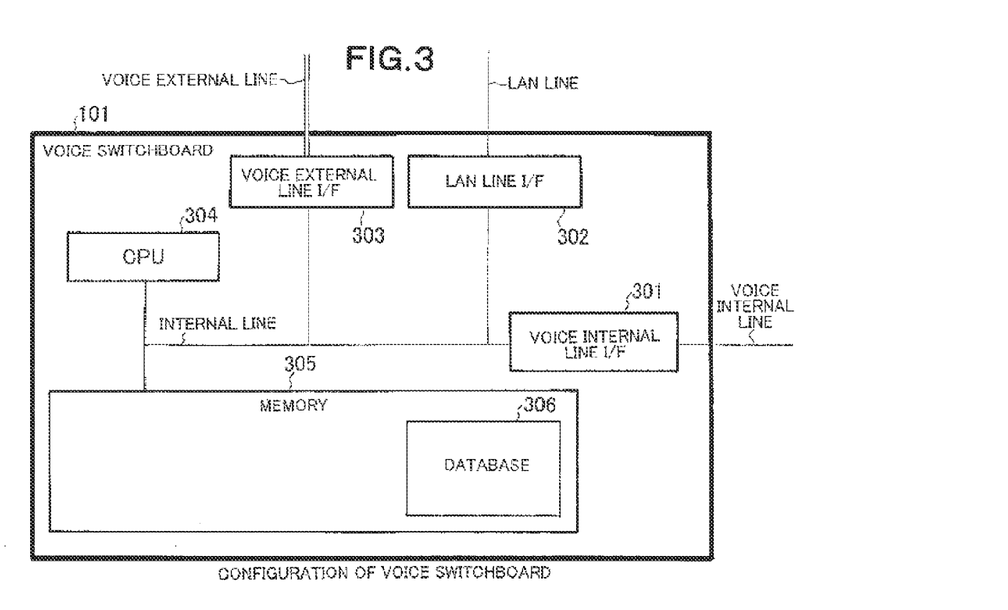
FIG. 3 is a block diagram showing a configuration of a switchboard shown in FIG. 1.

Referring to FIG. 3, operations performed by respective constituent elements of the switchboard 101 will be outlined. A voice internal line I/F 301 transmits and receives signals to and from the voice communication line. A LAN line I/F 302 transmits and receives signals to and from the LAN line. A voice external line I/F 303 transmits and receives signals to and from the voice external line. A CPU 304 controls entirety of the switchboard 101. A memory 305 is used as a work area when software or data necessary to control the switchboard 101 is used. A database 306 is an area for holding various setting data stored in the memory 305.

Figure 4:
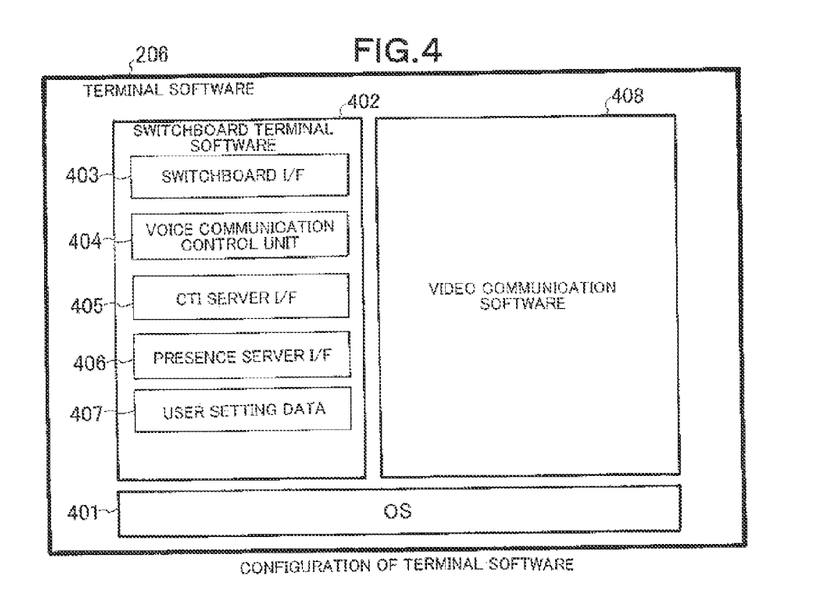
FIG. 4 is a block diagram showing an internal configuration of a memory shown in FIG. 2.

FIG. 4 is a schematic diagram showing a module configuration of software 211 stored in the memory 206 in each of the voice and video terminals 102 and 103. Switchboard terminal software 402 and video communication software 408 are application software operating on an OS (Operating System) 401.

The switchboard terminal software 402 is constituted by various software modules. A switchboard I/F 403 controls communication with the switchboard 101. A voice communication control unit 404 controls voice signal communication by communicating with the voice source I/F 202, the voice internal line I/F 203, and the LAN line I/F 204. A CTI server I/F 405 controls communication with the CTI server 109 by communicating with the LAN line I/F 204. A presence server I/F 406 controls communication with the presence server 110 by communicating with the LAN line I/F 204. User setting data 407 stores therein a user ID and a password of the user of the terminal, information on a current communication partner and the like.

The video communication software 408 is a general-purpose P2P communication software and has a video communication capability to start communication between the terminals in which the video communication software is mounted, to transmit and receive video data, and to perform a communication end processing in the first embodiment. The video communication software 408 includes a function of receiving address information on a communication partner, i.e., the other software mounted in the same terminal, and starting a communication with the partner according to the address information.

Figure 5:
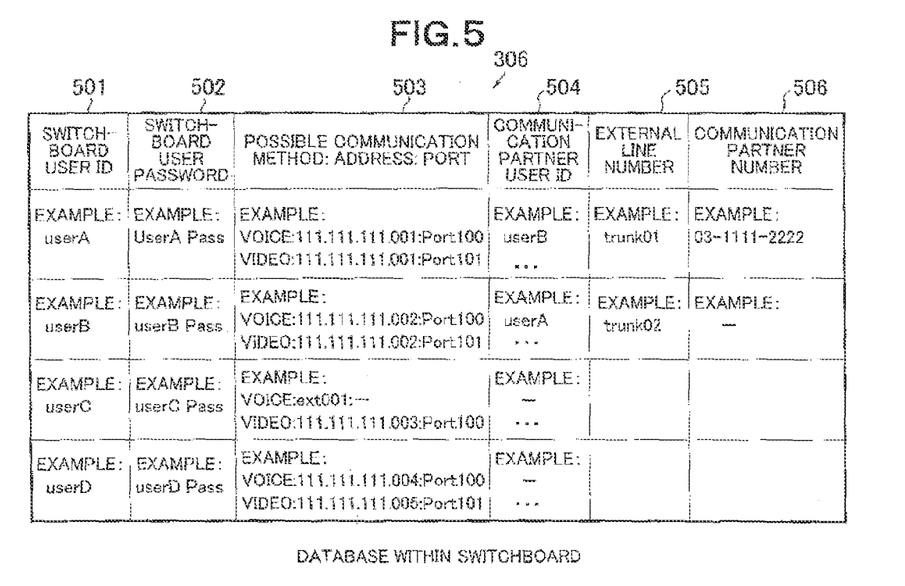
FIG. 5 is a schematic diagram showing an exemplary configuration of a database shown in FIG. 3.

FIG. 5 shows an example of contents of the database 306 stored in the memory 305 of the switchboard 101. In a "switchboard user ID" area 501, ID information on each of the users using the switchboard 101 is stored. In a "switchboard user password" area 502, a password corresponding to the user ID is stored. In a "possible communication method: address: port" area 503, a possible communication method of the terminal used by each user, an address of the terminal, and a port number used by the communication method in the terminal are stored. If the terminal supports a plurality of communication methods, a plurality of information is stored in the "possible communication method: address: port" area 503. In a "communication partner user ID" area 504, a user ID or an external line number of a communication partner is stored if the user is holding a communication. In an "external line" area 505, the number of each voice external line connected to the switchboard 101 is stored. In a "communication partner number" area 506, a telephone number of the communication partner on a voice external line having the external line number is stored.

Figure 6:
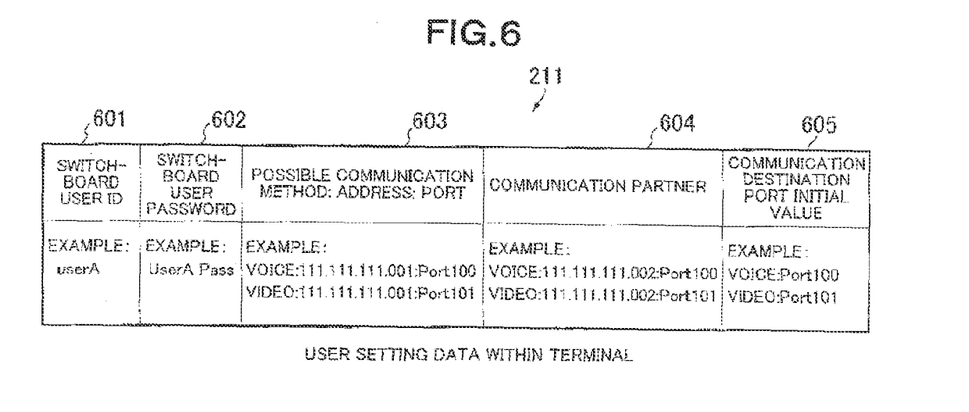
FIG. 6 is a schematic diagram showing user setting data for terminal software shown in FIG. 2.

FIG. 6 shows an example of contents of the terminal software 211 stored in the memory 206 of each of the voice and video terminals 102 and 103. In a "switchboard user ID" area 601, a switchboard user ID of a user using the terminal 102 or 103 is stored. In a "switchboard user password" area 602, a password corresponding to the user ID is stored. In a "possible communication method: address: port" area 603, a possible communicate method of the terminal, the address of the terminal, and the port number used by the communication method in the terminal are stored. If the terminal supports a plurality of communication methods, a plurality of information is stored per user ID. If the terminal is connected to the voice line, an internal line number is stored in place of the address and the port number. A "communication partner" area 604 is an area in which information on the communication partner is stored during a voice or video communication of the terminal. Namely, in the "communication partner" area 604, a user ID, an address, and a port number of the communication partner are stored. If the communication partner is a terminal that does not include a LAN line I/F and that is connected to the voice line or a terminal that is connected to the voice external line, an internal line number or an external line number is stored in the "communication partner" area 604 in place of the address, and the port number of the communication partner. In a "communication destination port initial value" area 605, a default destination port used if the communication port of the communication partner is unknown for every communication method is stored.

Operation according to the first embodiment will be described.

Figure 7:
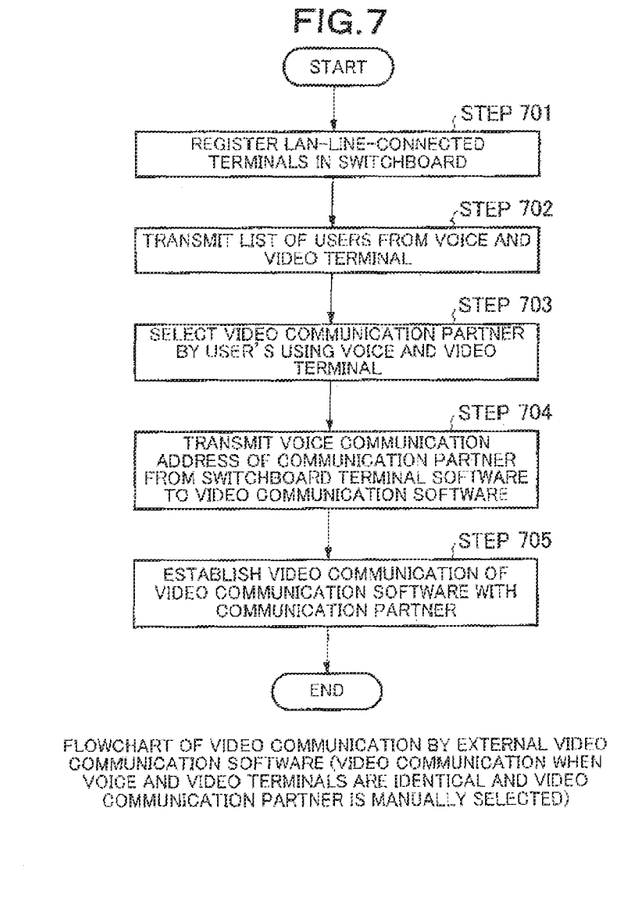
FIG. 7 is a flowchart showing operation performed by the communication system according to a first embodiment of the present invention.

First, an instance in which the user A starts a video communication with the user B while the user A is not on the phone will be described with reference to the flowchart of FIG. 7.

It is assumed herein that only the address and the port for the voice communication are stored in the "possible communication method: address: port" area 603 in the terminal software 211 stored in the memory 206 of each of the voice and video terminals 102 and 103. It is also assumed that the terminal configuration of each of the voice and video terminals 102 and 103 is such that the voice internal line I/F 203 is not present in the configuration of the voice and video terminal shown in FIG. 2.

First, the user A input a user ID and a password using the keyboard and display 207 of the voice and video terminal 102. In response to the input, the CPU 205 and the switchboard terminal software 402 operating in the memory 206 receive information on the user ID and the password of the user A via the user I/F 201 and the OS 401, respectively. Further, the input user ID is stored in the "switchboard user ID" area 601 and the password is stored in the "switchboard user password" area 602. The user ID and the password as well as the information stored in the "possible communication method: address: port" area 603 of the voice and video terminal 102 are passed to the OS 401 via the switchboard I/F 403, and transmitted to the switchboard 101 via the LAN I/F 204. When receiving the information via the LAN line I/F 302, the switchboard 101 searches the received user ID from the areas 501 in the database 306, and checks whether the password stored in the area 502 corresponding to the hit area 501 is identical with the received password. If the switchboard 101 confirms that the both passwords are identical, the switchboard 101 stores the received information of "possible communication method: address: port" in the corresponding area 503. Likewise, the user B registers the voice and video terminal 103 in the switchboard 101 (step 701).

The user A performs an operation for calling a video communication partner list using the keyboard and display 207 of the voice and video terminal 102. In response to the operation, a user list disclosure request is passed from the switchboard terminal software 402 to the OS 401 via the switchboard I/F 403, and transmitted to the switchboard 101 via the LAN I/F 204. When receiving the information via the LAN line I/F 302, the switchboard 101 extracts all the information stored in "switchboard user ID" areas 501 and "possible communication method: address: port" areas 503 corresponding to all the users in the database 306 included in the switchboard 101, and transmits the information to the voice and video terminal 102. The switchboard I/F 403 of the switchboard terminal software 402 in the voice and video terminal 102 receives the information via the LAN line I/F 204 and the OS 401, and the voice and video terminal 102 displays the information on the display 207 via the user I/F 201 (step 702).

The user A performs an operation for selecting the video communication partner using the keyboard and display 207 of the voice and video terminal 102. In response to the operation, the user ID of the selected video communication partner is passed from the switchboard terminal software 402 to the OS 401 via the switchboard I/F 403, and transmitted to the switchboard 101 via the LAN line I/F 204. When receiving the information via the LAN line I/F 302, the switchboard 101 searches the received user ID from the "switchboard user ID" areas 501 in the database 306 of the switchboard 101, extracts information described in the "possible communication method: address: port" area 503 corresponding to the hit record (area 501), and transmits the extracted information to the voice and video terminal 102. The switchboard I/F 403 of the switchboard terminal software 402 in the voice and video terminal 102 receives the information via the LAN line I/F 204 and the OS 401 (step 703).

The switchboard terminal software 402 checks the received possible communication method, address, and port to confirm whether video communication is present in the area 603. In the first embodiment, since the address and the port for the video communication are not described in the area 603, the switchboard terminal software 402 extracts only the address for the voice communication, extracts a video communication port (Port101) described in the "communication destination port initial value" area 605 as the port, and passes the address and the port to the video communication software 408. At the same time, the switchboard terminal software 402 writes contents of the information in the "communication partner" area 604 in the user setting data 211 as video communication partner information (step 704).

The video communication software 408 starts a video communication by setting the received address and port as the communication destination (step 705).

In the first embodiment, it is assumed that only the address and the port for the voice communication are stored in the "possible communication method: address: port" area 603 in the terminal software 211 stored in the memory 206 of each of the voice and video terminals 102 and 103. Alternatively, not only the address and the port for the voice communication but also the address and the port for the video communication may be stored in the "possible communication method: address: port" area 603.

In this alternative, the user A can confirm whether the communication partner is a video-communicable terminal in advance at the step 703. Moreover, at the step 704, the switchboard terminal software 402 passes the address and the port for the video communication among the information of the possible communication method, address, and port received from the switchboard 101 to the video communication software 408. It is thereby possible for the terminal 102 to flexibly set the video communication port.

Furthermore, in the first embodiment, the P2P communication software has been described while taking that for the video communication as an example. However, as long as the software enables communication only by receiving the address and the port, the software is not limited to the video communication software. By changing the video communication software 408 to arbitrary P2P communication software, the present invention is applicable to various communication methods such as mail communication, instant message communication, file sharing communication, whiteboard sharing communication, and application sharing communication.

[Second Embodiment]

A second embodiment of the present invention will be described.

In the first embodiment, it is necessary for each user to manually select the video communication partner by operating the terminal of the user. However, during a conversation, the communication partner may be automatically selected so as to be able to start a video communication.

Figure 8:
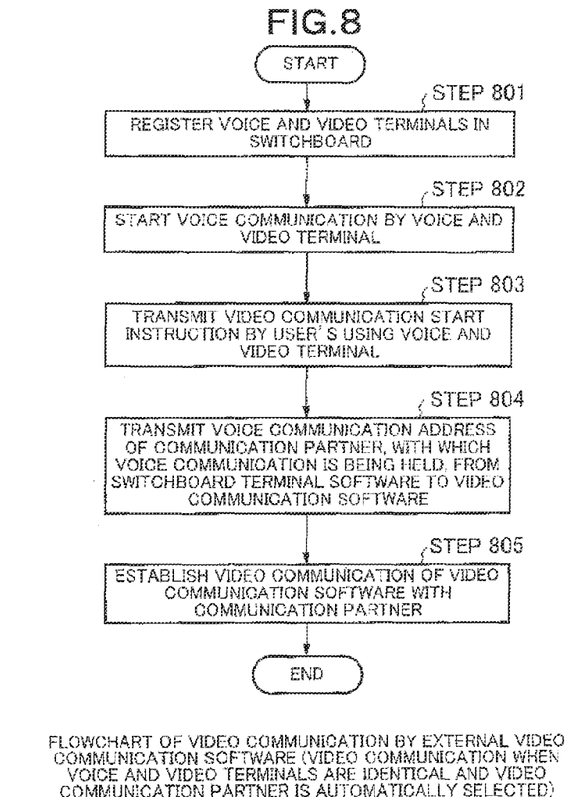
FIG. 8 is a flowchart showing operation performed by a communication system according to a second embodiment of the present invention.

An instance of automatically selecting the communication partner will be described with reference to the flowchart of FIG. 8.

It is assumed herein that the address and the port for the voice communication and those for the video communication are stored in the "possible communication method: address: port" area 603 of each of the voice and video terminals 102 and 103.

A step 801 is the same as the step 701 according to the first embodiment.

The voice and video terminal 102 transmits signals to the voice and video terminal 103 using the voice internal line, thereby establishing a voice communication. At this time, the address and the communication method (voice communication) of the voice signal destination (i.e., the terminal of the voice communication partner) are stored in the "communication partner" area 604 in the user setting data 211. Further, the switchboard software 402 writes the user ID of the communication partner in the "communication partner user ID" area 504 corresponding to each user in the database 306 of the switchboard 101 (step 802).

The user A performs an operation for staring a video communication with the current voice communication partner using the keyboard and display 207 of the voice and video terminal 102. In response to the operation, a current communication partner information request is passed from the switchboard terminal software 402 to the OS 401 via the switchboard I/F 403, and transmitted to the switchboard 101 via the LAN line I/F 204. When receiving the current communication partner information request via the LAN line I/F 302, the switchboard 101 reads information described in the "communication partner user ID" area 504 corresponding to the user A in the database 306, and searches the "switchboard user ID" area 501 corresponding to the user ID described in the area 504. Further, the switchboard 101 extracts the possible communication method, address, and port from the "possible communication method: address: port" area 503 corresponding to the hit area 501, and transmits the extracted information to the voice and video terminal 102. The switchboard I/F 403 of the switchboard terminal software 402 of the voice and video terminal 102 receives the information via the LAN line I/F 204 and the OS 401 (step 803).

The switchboard terminal software 402 checks the received possible communication method, address, and port, and confirms whether the video communication is present in the "possible communication method: address: port" area 503. If the video communication is present, the switchboard terminal software 402 passes the address and the port for the video communication to the video communication software 408, and at the same time, writes contents of the address and the port for the video communication in the "communication partner" area 604 in the user setting data 211 stored in the voice and video terminal 102 as the video communication partner information (step 804).

The video communication software 408 starts a video communication while setting the received address and port as the communication destination (step 805).

In the second embodiment, the switchboard 101 is inquired about the communication partner information at the step 803. Alternatively, if the communication partner information stored in the terminal 102 is used, there is no need to inquire the switchboard 101 about the communication partner information.

In this alternative, the switchboard terminal software 402 reads the information described in the "communication partner" area 604 in the user setting data 211 at the step 803. The switchboard terminal software 402 passes the address and the port described in the area 604 to the video communication software 408 at the step 804. It is thereby possible to control the video communication without using the switchboard 101 at all.

[Third Embodiment]

A third embodiment of the present invention will be described.

In the preceding first and second embodiments, the voice terminal is identical with the video terminal and the voice and video terminals have the same address. However, the video terminal and the voice and video terminals may be different terminals.

Figure 9:
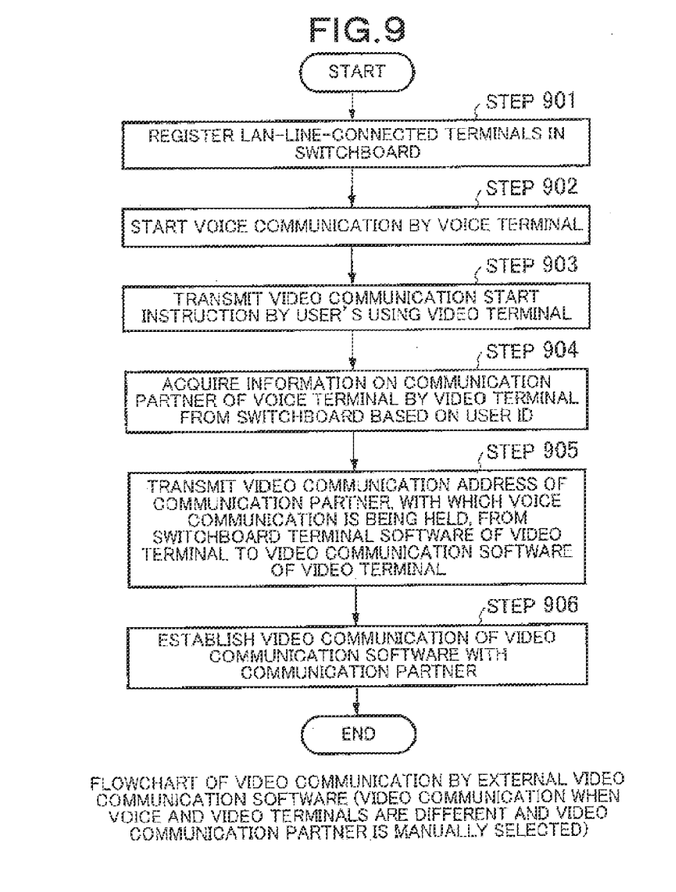
FIG. 9 is a flowchart showing operation performed by the communication system according to a third embodiment of the present invention.

An instance in which the video terminal and the voice and video terminals are different will be described with reference to the flowchart of FIG. 9.

It is assumed herein that the address and the port for the video communication are stored in the "possible communication method: address: port" area 603 of each of the video terminals 104 and 106, that the address and the port for the voice communication are stored in the "possible communication method: address: port" area 603 of the video terminal 105, and that the "possible communication method: address: port" area 603 of the voice terminal 107 is blank. It is also assumed that the internal line number of the voice terminal 107 is set in the "possible communication method: address: port" area 503 corresponding to the user C described in the "user ID area" 501 of the database 306 of the switchboard 101, as the address for the voice communication in advance, and that no port is described in the same "possible communication method: address: port" area 503. It is further assumed that the voice terminal 107 is already activated and on standby.

Moreover, it is assumed that the terminal configuration of each of the video terminals 104 and 106 is such that the voice internal line I/F 203 and the voice source I/F 202 are not present in the configuration of the voice and video terminal shown in FIG. 2, the terminal configuration of the voice terminal 105 is such that the voice internal line I/F 203 and the video I/F 209 are not present in the configuration of the voice and video terminal shown in FIG. 2, and that the terminal configuration of the voice terminal 107 is such that the video I/F 209 and the LAN line I/F 204 are not present in the configuration of the voice and video terminal shown in FIG. 2.

First, the user C registers the video terminal 104 and the voice terminal 107 in the switchboard 101, and the user D registers the voice terminal 105 and the video terminal 106 in the switchboard 101 using their respective user IDs and passwords, respectively through procedures similar to that of the step 701 in the first embodiment (step 901).

The voice terminal 107 transmits signals to the voice terminal 105 using the voice internal line, thereby establishing a voice communication. At this time, the address and the communication method (voice communication) of the voice signal destination (i.e., the terminal of the voice communication partner) are stored in the "communication partner" area 604 in the user setting data 211 stored in the terminal 107. Further, the switchboard software 402 writes the user ID of the communication partner in the "communication partner user ID" area 504 corresponding to each of the users C and D in the database 306 of the switchboard 101 when establishing the voice communication between them (step 902).

The user C performs an operation for staring a video communication with the current voice communication partner using the keyboard and display 207 of the voice and video terminal 104 (step 903).

In response to the operation, the switchboard terminal software 402 passes a current communication partner information request to the OS 401 via the switchboard I/F 403, and the current communication partner information request is transmitted to the switchboard 101 via the LAN line I/F 204. When receiving the current communication partner information request via the LAN line I/F 302, the switchboard 101 reads information described in the "communication partner user ID" area 504 corresponding to the user C in the database 306, and searches the "switchboard user ID" area 501 corresponding to the user ID described in the area 504. Further, the switchboard 101 extracts the possible communication method, address, and port from the "possible communication method: address: port" area 503 corresponding to the hit area 501, and transmits the extracted information to the video terminal 104. The switchboard I/F 403 of the switchboard terminal software 402 of the video terminal 104 receives the information via the LAN line I/F 204 and the OS 401 (step 904).

The switchboard terminal software 402 checks the received possible communication method, address, and port, and confirms whether the video communication is present in the "possible communication method: address: port" area 503. If the video communication is present, the switchboard terminal software 402 passes the address and the port for the video communication to the video communication software 408, and at the same time, writes contents of the address and the port for the video communication in the "communication partner" area 604 in the user setting data 211 stored in the video terminal 104 as the video communication partner information (step 905).

The video communication software 408 starts a video communication while setting the received address and port as the communication destination (step 906).

[Fourth Embodiment]

A fourth embodiment of the present invention will be described.

In the preceding first to third embodiments, the address and the port of the communication partner are passed to the video communication software 408 at the start of the video communication, and the video communication software 408 is entrusted with the subsequent video communication control. Due to this, even if the voice communication is finished, the user is forced to manually instruct the video communication software 408 for the video communication. Alternatively, the switchboard terminal software 402 may detect end of the voice communication using the CTI server I/F 405, and instruct the video communication software 408 to finish a video communication, thereby automatically finishing the video communication simultaneously with the end of the voice communication.

Figure 10:
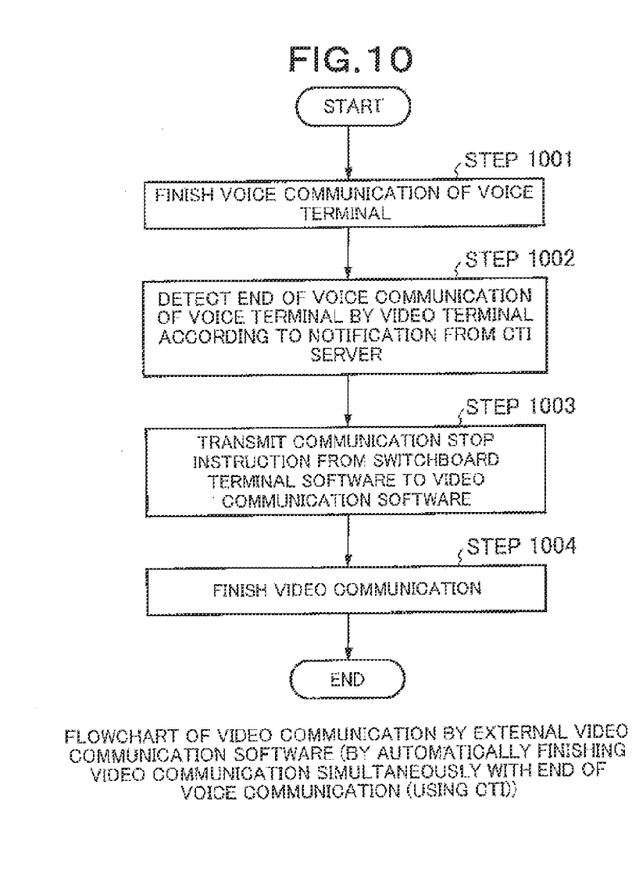
FIG. 10 is a flowchart showing operation performed by the communication system according to a fourth embodiment of the present invention.

An instance of automatically finishing the video communication simultaneously with the end of the voice communication using the CTI server I/F 405 will be described with reference to the flowchart of FIG. 10.

It is assumed herein that the switchboard terminal software 402 of the video terminal 104 is connected to the CTI server 109 via the CTI server I/F 405 and that the voice terminal 107 is registered as a CTI control target. It is also assumed that the CTI server 109 acquires a status (presence) of the voice terminal 107 by communicating with the voice switchboard 101 and transmits the status information to the CTI server I/F 405 of the video terminal 104. Further, it is assumed that all the procedures at the steps 901 to 906 are already carried out.

First, a voice communication between the voice terminal 107 of the user C and the voice terminal 105 of the user D is finished (step 1001).

The switchboard 101 notifies the CTI server 109 of the end of the voice communication between the voice terminals 105 and 107 via the LAN line I/F 302 simultaneously with the end of the voice communication. The CTI server 109 notifies the CTI server I/F 405 of the video terminal 104 that the voice terminal 107 finishes the voice communication (step 1002).

The switchboard terminal software 402 of the video terminal 104 reads video communication partner information from the "communication partner" area 604 corresponding to the user C in the user setting data 211, deletes the information from the area 604, and then passes a video communication end instruction as well as the information to the video communication software 408 (step 1003).

The video communication software 408 finishes the video communication for which the received address and port are set as the communication destination (step 1004).

[Fifth Embodiment]

A fifth embodiment of the present invention will be described.

In the fourth embodiment, the switchboard terminal software 402 detects the end of the voice communication by using the CTI server I/F 405. Alternatively, the switchboard terminal software 402 may detect the end of the voice communication using the presence server I/F 406, and instruct the video communication software 408 to finish a video communication, thereby automatically finishing the video communication simultaneously with the end of the voice communication.

Figure 11:
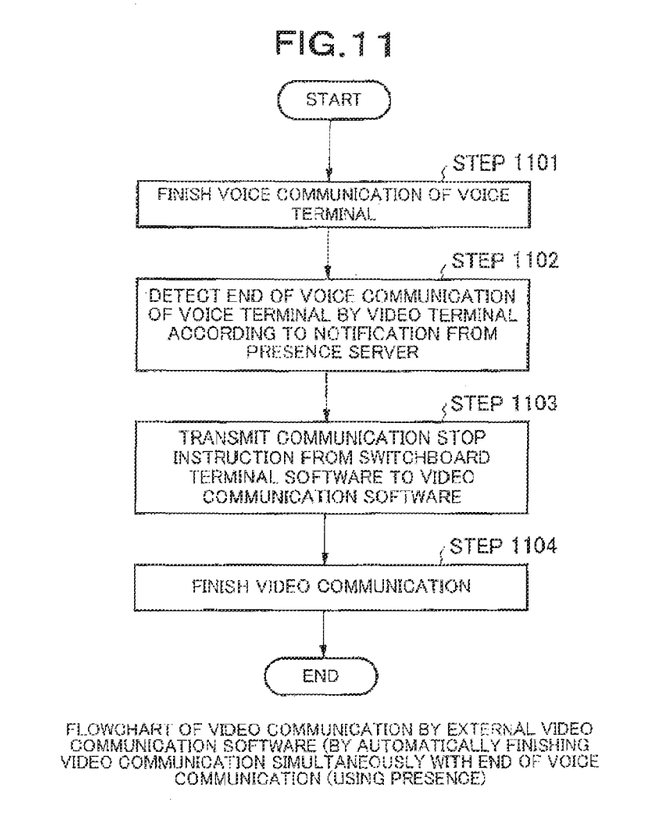
FIG. 11 is a flowchart showing operation performed by the communication system according to a fifth embodiment of the present invention.

An instance of automatically finishing the video communication simultaneously with the end of the voice communication using the presence server I/F 406 will be described with reference to the flowchart of FIG. 11.

It is assumed herein that the switchboard terminal software 402 of the video terminal 104 is connected to the presence server 110 via the presence server I/F 406 and that the voice terminal 107 is registered as a presence watching target. It is also assumed that the presence server 110 acquires a status (presence) of the voice terminal 107 by communicating with the switchboard 101 and transmits the status information to the presence server I/F 406 of the video terminal 104. Further, it is assumed that all the procedures at the steps 901 to 906 are already carried out.

First, a voice communication between the voice terminal 107 of the user C and the voice terminal 105 of the user D is finished (step 1101).

The switchboard 101 notifies the presence server 110 that the presence of the voice terminal 107 changes from a state of holding a voice communication to a standby state, via the LAN line I/F 302 simultaneously with the end of the voice communication. The presence server 110 notifies the presence server I/F 406 of the video terminal 104 that the voice terminal 107 finishes the voice communication (step 1102).

The switchboard terminal software 402 of the video terminal 104 regards the information as the end of the voice communication, reads video communication partner information from the "communication partner" area 604 corresponding to the user C in the user setting data 211, deletes the information from the area 604, and then passes a video communication end instruction as well as the information to the video communication software 408 (step 1103).

The video communication software 408 finishes the video communication for which the received address and port are set as the communication destination (step 1104).

[Sixth Embodiment]

In the preceding first to fifth embodiments, one-to-one voice or video communication is held. Alternatively, a video conference communication may be held by interlocking the voice or video communication with a voice conference by a plurality of terminals.

Figure 12:
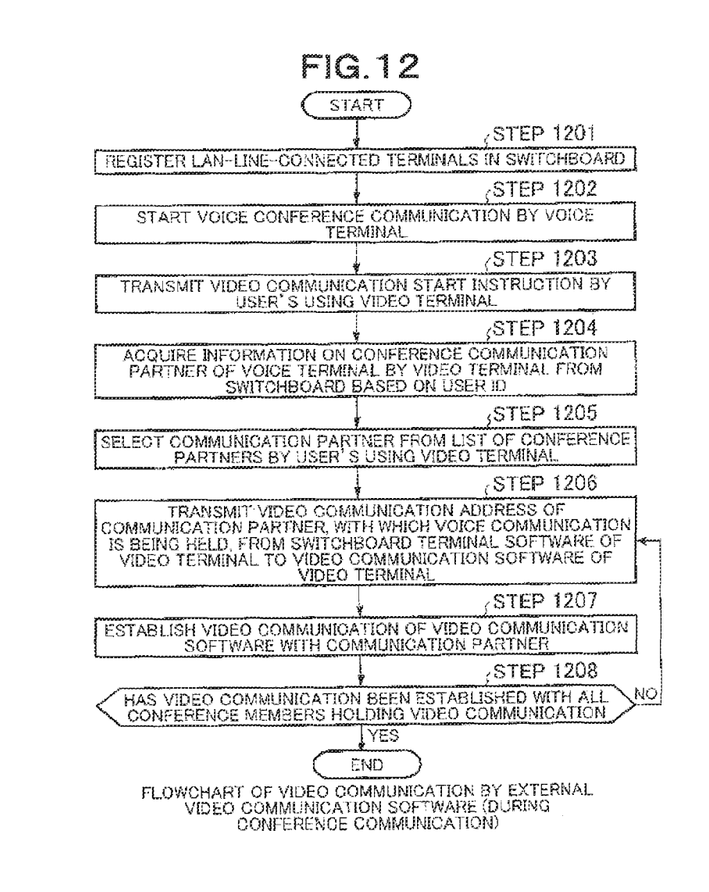
FIG. 12 is a flowchart showing operation performed by the communication system according to a sixth embodiment of the present invention.

An instance of holding a video conference communication will be described with reference to the flowchart of FIG. 12.

It is assumed herein that the address and the port for the voice communication and the address and the port for the video communication are stored in the "possible communication method: address: port" area 603 of the voice and video terminal 102, that the address and the port for the video communication are stored in the "possible communication method: address: port" area 603 of each of the video terminals 104 and 106, that the address and the port for the voice communication are stored in the "possible communication method: address: port" area 603 of the voice terminal 105, and that the "possible communication method: address: port" area 603 of the voice terminal 107 is blank. It is also assumed that the internal line number of the voice terminal 107 is set in the "possible communication method: address: port" area 503 corresponding to the user C described in the "user ID area" 501 of the database 306 of the switchboard 101, as the address for the voice communication in advance, and that no port is described in the same "possible communication method: address: port" area 503. It is further assumed that the voice terminal 107 is already activated and on standby. Further, it is assumed that the video communication software 408 can simultaneously hold video communications with a plurality of communication partners.

Moreover, it is assumed that the terminal configuration of each of the video terminals 104 and 106 is such that the voice internal line I/F 203 and the voice source I/F 202 are not present in the configuration of the voice and video terminal shown in FIG. 2, the terminal configuration of the voice terminal 105 is such that the voice internal line I/F 203 and the video I/F 209 are not present in the configuration of the voice and video terminal shown in FIG. 2, and that the terminal configuration of the voice terminal 107 is such that the video I/F 209 and the LAN line I/F 204 are not present in the configuration of the voice and video terminal shown in FIG. 2.

First, the user A registers the voice and video terminal 102, the user C registers the video terminal 104 and the voice terminal 107, and the user D registers the voice terminal 105 and the video terminal 106 in the switchboard 101 using their respective user IDs and passwords, respectively through procedures similar to that of the step 701 in the first embodiment (step 1201).

A conference communication is established among the voice and video terminal 102, the voice terminal 107, and the voice terminal 105. At this time, the addresses and the communication methods (voice communication) of the voice signal destinations (i.e., the terminals of the voice communication partners) are stored in the "communication partner" area 604 in the user setting data 211 in each of the terminals 102, 105, and 107. Further, the switchboard software 402 of each of the terminals 102, 105, and 107 writes the user IDs of the communication partners in the "communication partner user ID" area 504 corresponding to each of the users A, C, and D in the database 306 of the switchboard 101 when the conference communication is held among them (step 1202).

The user C performs an operation for staring a video communication with the current voice communication partners using the keyboard and display 207 of the voice and video terminal 104 (step 1203).

In response to the operation, the switchboard terminal software 402 of the voice and video terminal 104 passes a current communication partner information request to the OS 401 via the switchboard I/F 403, and the current communication partner information request is transmitted to the switchboard 101 via the LAN line I/F 204. When receiving the current communication partner information request via the LAN line I/F 302, the switchboard 101 reads information described in the "communication partner user ID" area 504 corresponding to the user C in the database 306, and searches a plurality of "switchboard user ID" areas 501 corresponding to the user IDs described in the areas 504, respectively. Further, the switchboard 101 extracts the possible communication methods, addresses, and ports from the "possible communication method: address: port" areas 503 corresponding to the hit plural areas 501, and transmits all the extracted information as well as the user IDs to the video terminal 104.

The switchboard I/F 403 of the switchboard terminal software 402 of the video terminal 104 receives the information via the LAN line I/F 204 and the OS 401 (step 1204).

The switchboard terminal software 402 checks all the received possible communication methods, addresses, and ports, and confirms whether the video communication is present in each of the "possible communication method: address: port" areas 503. If the video communication is present in each of the "possible communication method: address: port" areas 503, the switchboard terminal software 402 displays the user IDs of a plurality of video-communicable video communication partner candidates on the display 207 via the user I/F 201. Thereafter, the user C performs an operation for selecting an arbitrary video communication partner from among the displayed user IDs using the keyboard and display 207 of the video terminal 104 (step 1205).

In response to the selection operation, the switchboard terminal software 402 passes the address and the port of the selected user ID for the video communication to the video communication software 408, and at the same time, writes contents of the address and the port for the video communication in the "communication partner" area 604 in the user setting data 604 stored in the video terminal 104 as the video communication partner information (step 1206).

The video communication software 408 starts a video communication while setting the received address and port as the communication destination (step 1207).

The user C can additionally perform the operation for selecting a video communication partner from among the displayed user IDs using the keyboard and display 207 of the video terminal 104 if the user wants to hold a video communication with another user. In this case, the procedures at the steps 1206 to 1208 are repeatedly carried out whenever the selection operation is performed (step 1208).

Although the exemplary embodiments of the present invention have been described in detail, it should be understood that various changes, substitutions and alternatives can be made therein without departing from the sprit and scope of the invention as defined by the appended claims. Further, it is the inventor's intent to retain all equivalents of the claimed invention even if the claims are amended during prosecution.

What is claimed is:

1. A communication system including a plurality of terminals and a switchboard connected to the terminals, comprising:

means for causing each of the terminals to register one or more communication types which are executable on the terminal, an IP address of the terminal corresponding to said one or more communication types, one or more port numbers respectively corresponding to said one or more communication types, with the switchboard, while correlating said one or more communication types, said IP address and said one or more port numbers to an identifier of a user of the terminal;

means for, when one terminal among the terminals transmits a request for transmitting a list including at least the identifiers of the users, causing the switchboard to transmit the list to said one terminal;

means for, when said one terminal selects one of the identifiers of the users from the received list and transmits the selected identifier of the user to the switchboard, causing the switchboard to transmit, to said one terminal, said one or more communication types, said IP address and said one or more port numbers, which are correlated to the selected identifier of the user; and means for causing said one terminal to select a port number and establish a communication with the terminal having the IP address which corresponds to the selected identifier of the user and has been transmitted from the switchboard to said one terminal using the selected port number, wherein if said one or more communication types which are correlated to the selected identifier of the user and have been transmitted from the switchboard to said one terminal include a communication type which is requested to be started, said selected port number is the port number which corresponds to the communication type which is requested to be started with respect to the selected identifier of the user and has been transmitted from the switchboard to said one terminal.

2. The communication system according to claim 1, wherein if said one or more communication types which are correlated to the selected identifier of the user and have been transmitted from the switchboard to said one terminal do not include a communication type which is requested to be started, the selected port number is a default port number which corresponds to the communication type which is requested to be started with respect to the selected identifier of the user.

3. A communication method in a communication system including a plurality of terminals and a switchboard connected to the terminals, said method comprising the steps of:
  causing each of the terminals to register one or more communication types which are executable on the terminal, an IP address of the terminal corresponding to said one or more communication types, one or more port numbers respectively corresponding to said one or more communication types, with the switchboard, while correlating said one or more communication types, said IP address and said one or more port numbers to an identifier of a user of the terminal;
  when one terminal among the terminals transmits a request for transmitting a list including at least the identifiers of the users, causing the switchboard to transmit the list to said one terminal;
  when said one terminal selects one of the identifiers of the users from the received list and transmits the selected identifier of the user to the switchboard, causing the switchboard to transmit, to said one terminal, said one or more communication types, said IP address and said one or more port numbers, which are correlated to the selected identifier of the user; and
  causing said one terminal to select a port number and establish a communication with the terminal having the IP address which corresponds to the selected identifier of the user and has been transmitted from the switchboard to said one terminal using the selected port number,
wherein if said one or more communication types which are correlated to the selected identifier of the user and have been transmitted from the switchboard to said one terminal include a communication type which is requested to be started, said selected port number is the port number which corresponds to the communication type which is requested to be started with respect to the selected identifier of the user and has been transmitted from the switchboard to said one terminal.

4. The communication method according to claim 3,
wherein if said one or more communication types which are correlated to the selected identifier of the user and have been transmitted from the switchboard to said one terminal do not include a communication type which is requested to be started, the selected port number is a default port number which corresponds to the communication type which is requested to be started with respect to the selected identifier of the user.

* * * * *